United States Patent [19]

Ishikawa

[11] Patent Number: 4,672,390

[45] Date of Patent: Jun. 9, 1987

[54] INK JET PRINTER CARRIAGE ASSEMBLY

[75] Inventor: Chuji Ishikawa, Kawasaki, Japan

[73] Assignee: Ricoh Company, Ltd., Tokyo, Japan

[21] Appl. No.: 825,780

[22] Filed: Feb. 3, 1986

Related U.S. Application Data

[63] Continuation of Ser. No. 431,021, Sep. 30, 1982, abandoned.

[30] Foreign Application Priority Data

Oct. 20, 1981 [JP] Japan ................................ 56-167657

[51] Int. Cl.$^4$ ...................... G01D 15/16; G01D 15/18

[52] U.S. Cl. .................................. 346/75; 346/140 R

[58] Field of Search ............... 346/75, 140 PD, 140 IJ

[56] References Cited

U.S. PATENT DOCUMENTS 4,198,643 4/1980 Cha ...................................... 346/75

4,219,823 8/1980 Fathergill ............................. 346/75

OTHER PUBLICATIONS

Helinski, Mounting of an Ink Jet Nozzle, Nov. 1975, pp. 1813–1814, IBM Tech. Disc. Bull.

West, Ink Jet Deflecting Plate Arrangement, Jul. 1972, pp. 476–477, IBM Tech. Disc. Bul.

Holecek, Ink Jet Aiming Device, Dec. 1973, pp. 2237–2238, IBM Tech. Disc. Bul.

Denny, Adjustable Ink Jet Head Assembly, Feb. 1973, pp. 2787–2788.

*Primary Examiner*—Harold Broome

*Assistant Examiner*—Mark Reinhart

*Attorney, Agent, or Firm*—Cooper, Dunham Griffin & Moran

[57] ABSTRACT

An improved carriage assembly for use in ink jet printers is provided. The present ink jet printer carriage assembly includes a holder for holding an ink droplet projection nozzle and a charging electrode for charging ink droplets and the holder is so structured that it may be pivoted vertically as well as horizontally. Thus the ink jet projection direction may be adjusted with respect to its pitch direction as well as yaw direction. A deflection stage including a pair of oppositely arranged deflector electrodes is fixedly mounted on the carriage body; however, a gutter for collecting non-deflected ink droplets is adjustably provided. With such a structure, the whole assembly may be constructed quite with ease since minor mismatches may be corrected after assemblage; moreover, printed characters or images of excellent quality may be obtained.

12 Claims, 6 Drawing Figures

INK JET PRINTER CARRIAGE ASSEMBLY

This is a continuation application from application Ser. No. 431,021 filed Sept. 30, 1982, now abandoned.

BACKGROUND OF THE INVENTION

1. Field of the Invention

This invention generally relates to non-impact type printers, and, in particular, to an improved carriage assembly for use in ink jet printers.

2. Description of the Prior Art

Ink jet printers are well known in the art. In an ink jet printer, a carriage on which is mounted a nozzle head for projecting a series of ink droplets toward recording paper is provided in a reciprocatingly movable manner to traverse the width of recording paper. Usually, such a carriage assembly is mounted on a guide rail which extends in parallel with a platen roller around which record paper is placed. As the carriage assembly is driven to move along the guide rail from the home position determined at one end of the guide rail to the opposite end, ink droplets are projected and selectively deflected to be deposited on the record paper thereby forming desired characters or images thereon.

FIG. 1 illustrates a typical prior art carriage assembly for use in ink jet printers. As shown, it includes a carriage 3 which is mounted on a pair of guide rails 1,2 movably therealong. It is to be noted that provision is made of a platen roller for placement of record paper therearound to the right of the carriage assembly extending in parallel with the guide rails 1,2, though it is not specifically shown in FIG. 1. A nozzle head 4 provided with a nozzle member 5 is fixedly mounted on a holder plate 10 and it projects a series of ink droplets in a predetermined direction. Also fixedly mounted on the holder plate 10 in the downstream of the nozzle head 4 with respect to the direction of projection of ink droplets are a charging electrode 6 and a pair of deflecting electrodes 7, 7'. Thus, when the ink droplets are passed through the charging electrode 6, they come to bear charges and, therefore, they are selectively deflected as they pass through the gap between the deflecting electrodes 7,7' in which an electric field is produced. With such a structure, two modes of operation are feasible. That is, in one mode of operation, an image signal is supplied to the charging electrode 6 to change the amount of charges of individual droplets. In this case, a constant electric field is produced between the deflecting electrodes. On the other hand, the electric field produced between the deflecting electrodes 7,7' may be changed in accordance with an image signal with equally charging the ink droplets.

The trajectory of deflected ink droplets is shown by the reference numeral 9; whereas, the trajectory of non-deflected ink droplets is indicated by the reference numeral 9'. As shown, a gutter 8 is fixedly provided on the carriage 3 in the downstream of the deflection electrodes 7,7' such that it collects the non-deflected ink droplets. A bracket 3*a* extends upwardly from the top surface of the carriage 3 and the forward end of the holder plate 10 is pivoted to the bracket 3*a* at 11. The backward end portion of the holder plate 10 is provided with a hole through which an adjusting screw 12 extends. The head of the screw 12 is in engagement with the top surface of the holder plate 10 and its bottom portion is screwed into a threaded hole provided in the carriage 3. Also provided is a coil spring 12' which is loosely fitted onto the screw 12 between the carriage 3 and the holder plate 10 so that the holder plate 10 is normally pressed against the head of the screw 12.

In the above described prior art carriage assembly, the projecting direction may be adjusted in the vertical plane by turning the screw 12 clockwise or counterclockwise over a required number of times. This allows to obtain a limited alignment between the elements fixedly mounted on the holder plate 10 and the gutter 8. It should, however, be noted that the prior art structure still requires a precise sidewise alignment at the time of manufacture since the projecting direction cannot be adjusted sidewise after manufacture. In this regard, a mist absorbing plate 13 provided with a slit 14 is usually desired to be mounted on the gutter 8 to prevent blurring of a printed image from occurring as shown in FIG. 2. In such a case, it is desirable to make the slit 14 smaller. However, this then requires a higher precision in alignment among the elements to be provided on the carriage 3. In particular, the projecting direction of ink droplets must be set with high accuracy. Otherwise, the ink droplets may strike the edges of the slit 14 when deflected substantially as shown in FIG. 2.

FIG. 3 shows a typical structure in cross section of the prior art deflecting stage including a pair of deflection electrodes arranged opposite to each other. As shown, a deflecting electrode 15 is fixed to a base plate 16 through a screw 17. Also fixed to the base plate 16 by means of a screw 19 is an angle-shaped support member 18 which, in turn, supports the other deflecting electrode 20 as fixed thereto by means of a screw 21. The deflecting electrodes 15 and 20 are oppositely arranged to define a predetermined gap therebetween as a part of the passage for the ink droplets. A voltage may be applied between the electrodes 15 and 20 so that an electric field is produced in the gap. The level of the voltage applied depends upon the size of the gap, but a voltage of 3.5 kV may be applied, for example, in the case where a constant electric field is desired in the gap.

However, at the beginning of the ink jet projection, a significant amount of mist or fine, satellite droplets are created, and they tend to be collected on the electrode 15 or 20 depending on the sign of their net charges. Some of these satellite droplets are also deposited on the support member 18 to form a leakage path between the electrodes 15 and 20. The formation of such a leakage path is disadvantageous because it effectively decreases the strength of the field produced in the gap.

As exemplified above, various disadvantages are found in the prior art carriage assembly for use in ink jet printers and there has been a need for the advent of an improved ink jet printer carriage assembly.

SUMMARY OF THE INVENTION

The disadvantages of the prior art are overcome with the present invention and an improved carriage assembly for use in ink jet printers is herein provided.

In accordance with one aspect of the present invention, there is provided a carriage assembly for use in an ink jet printer comprising: a carriage which may be mounted in said printer in a reciprocatingly movable manner along a predetermined path; projecting means for projecting charged ink droplets in succession in a predetermined projecting direction; holding means for holding said projecting means on said carriage, said holding means adjusting said predetermined projecting direction in a first plane and also in a second plane which is normal to said first plane; a pair of deflector electrodes spaced apart from each other to provide a gap therebetween and disposed in the downstream of said projecting means, an electric field being produced in said gap through which said charged ink droplets are passed; and support means for supporting said pair of deflector electrodes fixedly on said carriage.

In accordance with the present invention, projecting means for projecting charged ink droplets is provided such that its direction for projecting charged ink droplets may be adjusted three-dimensionally,i.e., horizontally as well as vertically. Many advantages accrue from such a structure. For example, relatively large tolerances are allowed, which will greatly contribute to facilitate the manufacturing process since minor misalignments may be corrected after manufacture. Furthermore, finer alignment among the elements may be easily obtained thereby allowing to form printed characters or images of excellent quality.

It is therefore a primary object of the present invention to provide an improved carriage assembly for use in an ink jet printer.

Another object of the present invention is to provide an ink jet printer carriage assembly capable of adjusting the projecting direction of charged ink droplets three-dimensionally,i.e., horizontally as well as vertically.

A further object of the present invention is to provide an ink jet printer carriage assembly which is easy and less expensive to manufacture.

A still further object of the present invention is to provide an ink jet printer carriage assembly having a deflecting stage which is virtually leakage free.

A still further object of the present invention is to provide an ink jet printer carriage assembly suited for high speed operation.

Other objects, advantages and novel features of the present invention will become apparent from the following detailed description of the invention when considered in conjunction with the accompanying drawings.

DESCRIPTION OF THE PREFERRED EMBODIMENTS

Figure 1:
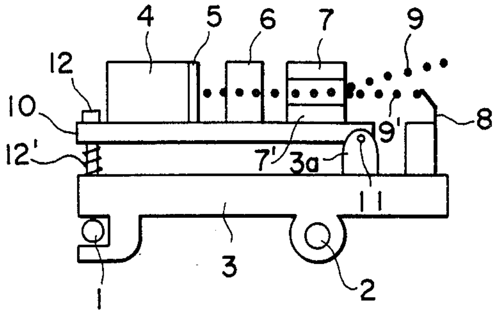
FIG. 1 PRIOR ART
FIG. 1 is a schematic illustration showing a prior art ink jet printer carriage assembly in which the projecting direction of charged ink droplets may be adjusted only two-dimensionally,i.e., vertically.
Figure 2:
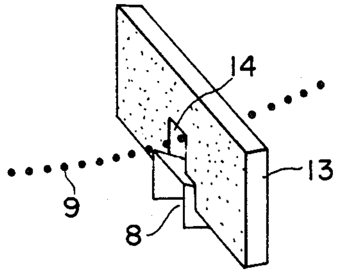
FIG. 2 PRIOR ART
FIG. 2 is a schematic illustration in perspective showing when the mist absorbing plate 13 with the notch 14 is arranged above the gutter 8.
Figure 3:
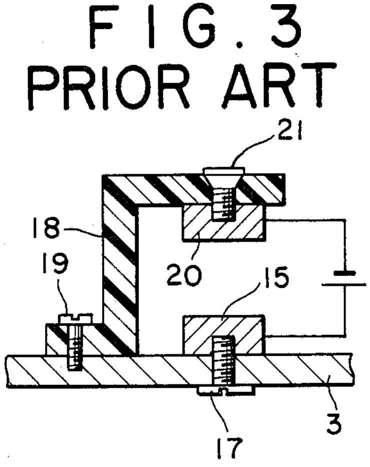
FIG. 3 PRIOR ART
FIG. 3 is a cross-sectional view showing a typical structure of the prior art deflecting stage including a pair of oppositely arranged deflecting electrodes 15 and 20 to which a high voltage is applied.
Figure 4:
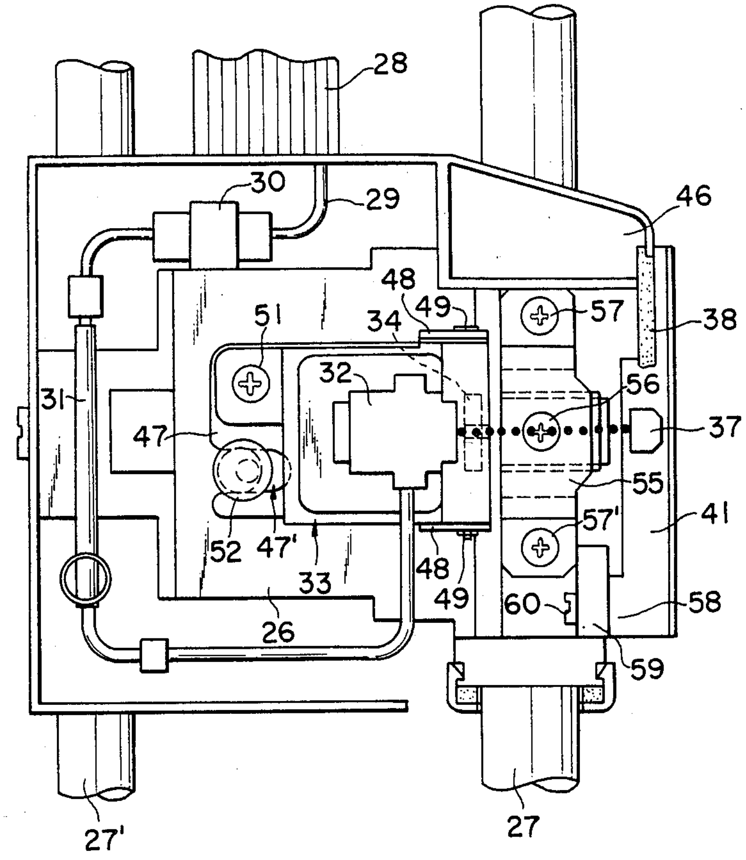
FIG. 4 is a plan view showing one embodiment of the present carriage assembly.
Figure 5:
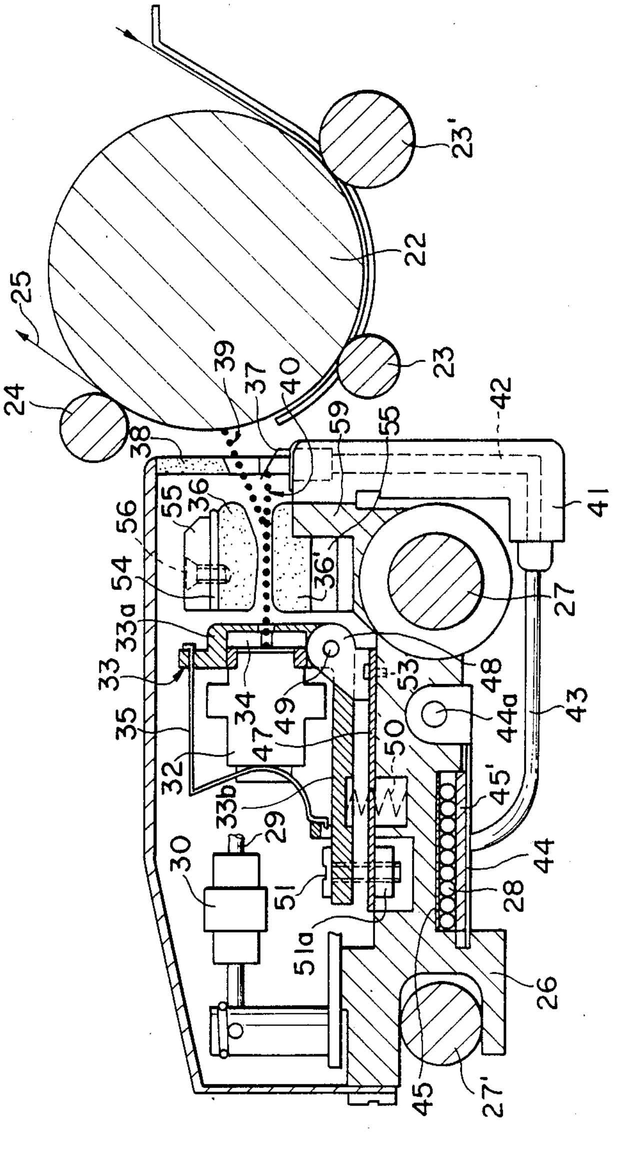
FIG. 5 is a side elevational view partly in cross-section of the carriage assembly shown in FIG. 4 with the platen roller 22 also shown to the right of the assembly.

Referring now to FIGS. 4 and 5, there is shown an ink jet printer carriage assembly embodying the present invention. As shown, the present carriage assembly includes a carriage or main body 26 which is adapted to move along a pair of parallel guide rails 27 and 27' in a reciprocating manner. The guide rods or rails 27 and 27' are fixedly mounted on the housing (not shown) of an ink jet printer, which also supports a platen roller 22 rotatably. Around the platen roller 22 are provided pressure rollers 23 and 23' and a paper bail roller 24, which are all provided to be rotatable and shiftable toward or away from the platen roller 22 by means of respective levers (not shown). Paper is advanced stepwise in the direction indicated by the arrow 25 every time when the printing of a single line is completed.

As shown, the carriage 26 is generally in the shape of a rectangular body and it reciprocates along the guide rails 27 and 27' thereby traversing the width of the paper which is being advanced by the platen roller 22. The carriage 26 is preferably formed by plastic molding as a unit. Most preferably, sliding contact sections, which come into sliding contact with the guide rails 27, 27' when mounted, are integrally formed by the same material which forms the body of the carriage 26. Such a structure is feasible in ink jet printers because the carriage 26 is not subjected to incremental printing operation as in ordinary impact printers and thus it may be moved at constant speed along the guide rails 27 and 27' while carrying out printing operation along a line. Since the carriage 26 may be moved at constant speed from one end of the guide rails 27, 27' to the other end, frictional force acting on the sliding contact sections of the carriage 26 is less severe. Moreover, in such a structure, no separate bearings need to be provided, and, thus, the carriage 26 may be made extremely light in weight. For example, the carriage 26 of the present assembly may be as light as 150 grams as compared with a typical carriage for impact printers weighing about 1 kg.

As shown in FIGS. 4 and 5, one end of a carriage harness 28, which includes electrical lines for supplying signals to control projection of ink droplets and tubes for supplying or collecting ink, is connected to the bottom of the carriage 26. An ink supply tube 29 extending from the harness 28 is connected to a filter 30 which in turn is connected to a nozzle head 32 through a heater 31 by means of tubing. Thus, ink is supplied to the nozzle head 32 as pumped through the tube 29 by means of a pump (not shown) provided at the other end of the tube 29. The nozzle head 32 is provided with a nozzle through which ink is discharged to form a series of ink droplets as projected in a predetermined direction.

As best shown in FIG. 5, the nozzle head 32 is fixedly mounted on an angle-shaped holder 33 which also holds a charging electrode 34 fixedly in front of the nozzle head 32. That is, the angle-shaped holder 33 includes a vertical section **33*a* and a horizontal section 33*b*. The vertical section 33*a* is provided with a recess to receive therein the charging electrode 34. The front end of the nozzle head 32 is also inserted into the recess and a leaf spring 35 is so provided that it presses the nozzle head 32 toward the vertical section 33*a* from its back. Thus the nozzle head 32 in effect presses the charging electrode 34 against the vertical section 33*a* through a spacer to keep the charging electrode 34 is position. Accordingly, the nozzle head 32, charging electrode 34 and holder 33 together form an integral structure by means of the spring 35**.

Below the holder 33 is disposed a base plate 47 from which a pair of brackets 48,48 extend upwardly. The brackets 48,48 are provided with pivots 48,48, respectively, which are loosely fitted into respective bores formed at the corner section of the angle-shaped holder 33. Thus the holder 33 is pivotally provided and the direction of projection of ink droplets from the nozzle head 32 may be adjusted vertically or in a vertical plane including the projection direction of ink droplets. In this connection, it should be noted that an adjustment screw 51 is provided as extending through a hole provided in the horizontal section of the holder 33. The head of the screw 51 is in engagement with the top surface of the horizontal section of the holder 33 and its bottom end is threaded into a nut 51*a* which is fixedly attached to the base plate 47. Furthermore, a coil spring 50 is provided as sandwiched between the horizontal section of the holder 33 and the carriage 26; however, it is more preferable to provide the spring 50 between the horizontal section 33*b* and the base plate 47. As a result of such a structure, the holder 33 is normally biased to pivot in the clockwise direction so that the pitch angle of the holder 33 and thus the nozzle head 32 may be easily determined simply by turning the screw 51 clockwise or counter-clockwise.

It should further be noted that in the present carriage assembly the base plate 47 is provided such that it slides on the top surface of the carriage 26 around a pin 53. Stated more in detail, the pin 53 is planted into the carriage 26 such that it extends through a hole provided in the base plate 47. And, as shown in FIG. 4, an eccentric rod 52 is rotatably provided on the carriage 26 such that its eccentric portion is fitted into a notch 47' defined in the base plate 47. Therefore, by turning the eccentric rod 52 clockwise or counter-clockwise, the yaw angle of the holder 33 and thus the nozzle head 32 may be easily determined. In other words, the direction of projection of ink droplets may also be adjusted horizontally or in a horizontal plane. As described above, in accordance with the present carriage assembly, not only the pitch angle but also the yaw angle of the nozzle head 32 can be adjusted with ease thereby permitting the direction of projection of ink droplets be adjusted three-dimensionally.

Figure 6:
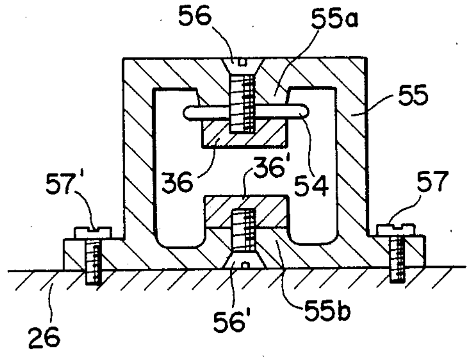
FIG. 6 is a cross-sectional view showing one embodiment of the deflecting stage forming a part of the present carriage assembly.

A deflecting stage is defined in the downstream of the combined structure of nozzle head 32 and charging electrode 34. The deflecting stage includes a pair of oppositely arranged deflecting electrodes 36 and 36' which define a gap or ink passage therebeween. The detailed structure of the deflecting stage is illustrated in cross section in FIG. 6. As shown, the deflecting electrodes 36 and 36' are fixedly attached by means of screws 56 and 56', respectively, to a square-shaped support 55 which in turn is fixedly attached to the carriage 26 through screws 57 and 57'. It is to be noted that the support 55 is provided with ridges 55*a* and 55*b* and the upper deflecting electrode 36 is attached to the upper ridge 55*a* with a wing member 54 formed by an insulating material sandwiched therebetween. Another wing member may be similarly provided between the lower deflecting electrode 36' and the lower ridge 55*b*. It is to be noted that the wing member 54 is larger than the deflecting electrode and it projects into the space defined in the support 55. Thus provision of the wing and/or the ridge allows to prevent the formation of a leakage path between the two electrodes 36 and 36' along the surface. More preferably, the wing member 54 and/or part or the whole of the support 55 should be treated with water repellent, which also contributes to prevent the formation of a leakage path between the electrodes 36 and 36'.

Further downstream of the deflecting stage is disposed a gutter 37 which is fixedly mounted on a collector unit 41 which in turn is detachably mounted on the carriage 26 as will be described further in detail later. Above the gutter 37 is disposed a mist absorbing plate 38 which is fixedly mounted on the carriage 26. As best shown in FIG. 5, those ink droplets charged by the charging electrode 34 are deflected as passing through the gap defined between the deflecting electrodes 36 and 36' and they are deposited on the paper held around the platen roller 22 to form desired characters and images as indicated by the reference numeral 39. On the other hand, those ink droplets that are not charged will advance straight without deflection as indicated by the reference numeral 40 and they will be collected into the gutter 37. The thus collected ink is then returned to the pump (not shown) through a hole 42 provided in the collection unit 41, tube 43 and the harness 28. In this manner, the recovered ink may be reused.

The reference numeral 44 indicates a harness holding plate which is pivoted to the carriage body at 44*a*. Any suitable fixing means known to those skilled in the art may be provided to keep the holding plate 44 in position. Also provided are shock absorbing members 45 and 45' to sandwich the harness 28 thereby preventing the harness from receiving undesired shocks while the present carriage assembly is in operation. The shock absorbing members may be preferably made of soft sponge or foam materials. In addition, the reference numeral 46 indicates a pad which is provided on the carriage 26 and it is connected to the ink mist absorbing plate 38. The pad 46 is preferably comprised of a plastic foam material and it functions as a sink for the ink mist absorbing plate 38 since the ink trapped in the plate 38 is then transferred to the pad 46.

A projection 59 is defined at the front end of the carriage 26. The projection 59 is provided with a hole or slot through which a screw 60 extends. On the other hand, the ink collection unit 41 is provided with a base portion 58 which is provided with a threaded hole and which may be brought into surface contact with the projection 59. Thus upon completion of determination of relative positional relation between the carriage 26 and the collection unit 41, or more precisely between the non-deflected ink projection direction and the gutter 37, the collection unit 41 may be fixed to the carriage 26 by tightening the screw 60. Accordingly, the position of the gutter 37 may be advantageously adjusted also.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. A carriage assembly for use in an ink jet printer comprising:

a carriage which may be mounted in said printer in a reciprocatingly movable manner along a predetermined path;

projecting means for projecting ink droplets, charged or uncharged, in succession in a predetermined projecting direction, said projecting means including a nozzle head for discharging a series of said ink droplets and a charging electrode located in front of said nozzle head for selectively charging said ink droplets;

holding means for holding said projecting means on said carriage, said holding means adjusting said predetermined projecting direction in a first plane and also in a second plane which is normal to said first plane, said holding means including a base plate which is pivoted to said carriage horizontally pivotally and a holder which is pivoted to said base plate vertically and which securely holds said projecting means, said holder being an angle shaped holder including a vertical section which is provided with a recess for receiving therein said charging electrode and a front end portion of said nozzle head clamped in position by a spring and a horizontal section which extends generally in parallel with said base plate, said holder being spring-biased such that said horizontal section tends to move away from said base plate with the provision of a first screw connected between said horizontal section and said base plate thereby allowing to adjust the pitch angle of said projecting direction by turning said first screw in a desired direction, said holding means further including laterally adjusting means for adjusting the lateral pivotal position of said base plate about its pivoted point with respect to said carriage;

a pair of deflector electrodes spaced apart from each other to provide a gap therebetween and disposed in the downstream of said projecting means, an electric field being produced in said gap through which said ink droplets are passed;

support means for supporting said pair of deflector electrodes fixedly on said carriage, said support means including a pair of oppositely arranged ridges on which said deflector electrodes are fixedly mounted, respectively, mounted on said corresponding ridge with a wing member sandwiched therebetween; and a gutter adjustably disposed in the downstream of said pair of deflector electrodes, said gutter being adjustably positioned to collect non-deflected ink droplets passing through said gap between said pair of deflector electrodes.

2. A carriage assembly of claim 1 wherein said first plane is a vertical plane which is defined by the direction of deflection of said ink droplets by said pair of deflector electrodes and said second plane is a horizontal plane which includes the non-deflected trajectory of said ink droplets.

3. A carriage assembly of claim 1 wherein said projecting means includes a nozzle head for discharging a series of ink droplets in a predetermined direction and a charging electrode securely positioned in front of said nozzle head for charging said ink droplets.

4. A carriage assembly of claim 3 wherein said charging electrode selectively charges said ink droplets.

5. A carriage assembly of claim 1 wherein said laterally adjusting means includes an eccentric rod rotatably planted in said carriage and a notch provided in said base plate, said eccentric rod is fitted in said notch thereby rotation of said eccentric rod causes said base plate to pivot around its pivoted point.

6. A carriage assembly of claim 1 further comprising a separate collector unit on which said gutter is fixedly mounted, said collector unit being detachably mountably to said carriage by means of appropriate fixing means.

7. A carriage assembly of claim 1 wherein said wing member is substantially larger than said deflector electrode so that it projects beyond the outer boundary of said deflector electrode.

8. A carriage assembly of claim 7 wherein said wing member is comprised of an electrically insulating material.

9. A carriage assembly of claim 1 wherein said wing member is treated with water repellent.

10. A carriage assembly of claim 1 wherein said carriage is provided with a recess at its bottom for receiving therein a harness, including electrical lines and tubes for transporting ink.

11. The carriage assembly of claim 10 wherein said carriage is further provided with a pivotal harness holding plate which may be pivoted to close said recess with said harness placed therein.

12. The carriage assembly of claim 11 wherein said carriage is further provided with a first shock absorbing material fixedly attached within said recess and a second shock absorbing material fixedly attached to said pivotal harness holding plate so that said harness is sandwiched between said first and second shock absorbing materials when said harness holding plate is pivoted closed.

* * * * *